United States Patent
Bergeal et al.

(10) Patent No.: US 10,537,879 B2
(45) Date of Patent: Jan. 21, 2020

(54) CATALYST AND METHOD OF PREPARATION

(71) Applicant: Johnson Matthey Public Limited Company, London (GB)

(72) Inventors: David Bergeal, Royston (GB); Andrew Francis Chiffey, Royston (GB); Peter Johnston, Royston (GB); Francois Moreau, Royston (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/468,505

(22) Filed: Mar. 24, 2017

(65) Prior Publication Data
US 2017/0341059 A1   Nov. 30, 2017

Related U.S. Application Data

(63) Continuation of application No. 14/002,971, filed as application No. PCT/GB2012/050490 on Mar. 5, 2012, now Pat. No. 9,616,409.
(Continued)

(30) Foreign Application Priority Data

Jun. 27, 2011 (GB) .................................. 1110850.3

(51) Int. Cl.
*B01J 23/58*      (2006.01)
*B01J 23/52*      (2006.01)
(Continued)

(52) U.S. Cl.
CPC .............. *B01J 23/52* (2013.01); *B01D 53/94* (2013.01); *B01D 53/945* (2013.01); *B01J 23/44* (2013.01);
(Continued)

(58) Field of Classification Search
CPC . B01J 23/52; B01J 23/464; B01J 23/44; B01J 35/002; B01J 35/006; B01J 37/038;
(Continued)

(56) References Cited

U.S. PATENT DOCUMENTS 3,822,308 A * 7/1974 Kronig .................... B01J 23/44
                                                      560/245
3,939,199 A * 2/1976 Fernholz ................. B01J 23/40
                                                      560/8
(Continued)

OTHER PUBLICATIONS

Radnik et al. "Influence of the Precipitation Agent in the Deposition-Precipitation on the Formation and Properties of Au Nanoparticles Supported on Al2O3" J. Phys. Chem. B, 2006, 110 (47), pp. 23688-23693, Nov. 3, 2006 (Year: 2006).*

*Primary Examiner* — Haytham Soliman

(57) ABSTRACT

A method of making a supported catalytic species comprising an alloy of at least two metals, comprises the steps of:
(i) combining a particulate support material, a solution of a first metal compound, a solution of a second metal compound, and a solution of an alkaline precipitating agent to form a slurry mixture;
(ii) agitating the resultant mixture; and
(iii) contacting the solids with a reducing agent,
wherein the first metal in the first metal compound and the second metal in the second metal compound is each independently selected from the group consisting of gold, palladium, platinum, rhodium, iridium, silver, osmium and ruthenium; and wherein the first metal is not the same as the second metal.

24 Claims, 2 Drawing Sheets

Related U.S. Application Data

(60) Provisional application No. 61/449,301, filed on Mar. 4, 2011.

(51) Int. Cl.
| | | |
|---|---|---|
| *B01D 53/94* | (2006.01) | |
| *B01J 37/03* | (2006.01) | |
| *B01J 37/16* | (2006.01) | |
| *B22F 9/24* | (2006.01) | |
| *C22C 5/00* | (2006.01) | |
| *B01J 23/44* | (2006.01) | |
| *B01J 23/46* | (2006.01) | |
| *B01J 35/00* | (2006.01) | |

(52) U.S. Cl.
CPC .......... *B01J 23/464* (2013.01); *B01J 35/002* (2013.01); *B01J 35/006* (2013.01); *B01J 37/035* (2013.01); *B01J 37/038* (2013.01); *B01J 37/16* (2013.01); *B22F 9/24* (2013.01); *C22C 5/00* (2013.01); *B01D 2255/106* (2013.01); *B01D 2255/1021* (2013.01); *B01D 2255/1023* (2013.01); *B01D 2255/1025* (2013.01); *B01D 2255/92* (2013.01); *Y02T 10/22* (2013.01)

(58) Field of Classification Search
CPC .......... B01J 37/16; B01J 37/035; C22C 5/00; B01D 53/94; B01D 53/945; B01D 2255/106; B01D 2255/1025; B01D 2255/1021; B22F 9/24; Y02T 10/22
See application file for complete search history.

(56) References Cited

U.S. PATENT DOCUMENTS

| | | | | |
|---|---|---|---|---|
| 4,048,096 A | * | 9/1977 | Bissot | B01J 23/52 |
| | | | | 502/170 |
| 2004/0043898 A1 | * | 3/2004 | Noda | B01J 37/0248 |
| | | | | 502/328 |
| 2008/0125313 A1 | * | 5/2008 | Fujdala | B01D 53/945 |
| | | | | 502/330 |

* cited by examiner

CATALYST AND METHOD OF PREPARATION

CROSS-REFERENCE TO RELATED APPLICATIONS

This application is a Continuation to U.S. patent application Ser. No. 14/002,971, allowed on Dec. 2, 2016, which is the U.S. National Phase Application of PCT International Application No. PCT/GB2012/050490, filed Mar. 5, 2012, and claims priority benefit of U.S. Provisional Patent Application No. 61/449,301, filed Mar. 4, 2011 and Great Britain Patent Application No. 1110850.3, filed Jun. 27, 2011, the disclosures of all of which are incorporated herein by reference in their entireties for all purposes.

FIELD OF THE INVENTION

The present invention relates to a new method of preparing catalyst compositions and to catalyst compositions made by the new method. In particular, the invention relates to methods of preparing catalysts containing two or more precious metals including platinum group metals, that is one or more metals selected from the group consisting of ruthenium, rhodium, palladium, osmium, iridium and platinum; and silver and gold.

BACKGROUND OF THE INVENTION

Catalysts comprising a combination of platinum and palladium have been found to be useful as oxidation catalysts in catalytic converters fitted on vehicles having a diesel engine.

Another combination of metals useful in catalysis is gold and palladium. Catalysts comprising or consisting of gold and palladium on support materials are known for use as catalysts in many different chemical reactions. The use of Pd/Au catalysts in the manufacture of vinyl acetate has been well-known for many years and a large number of patents describe such processes, the catalyst and methods of making them. For example, U.S. Pat. No. 3,775,342 describes the preparation of a Pd/Au catalyst on silica for preparing vinyl esters by impregnating the support with solutions of gold and palladium compounds followed by drying and further treatment including reduction to produce palladium and gold in the metallic state. U.S. Pat. No. 5,274,181 describes, for use in vinyl acetate production, a catalyst consisting of a catalyst support having a particle diameter from about 3 to about 7 mm and a pore volume of 0.2 to 1.5 ml per gram; palladium and gold distributed in the outermost 1.0 mm thick layer of the catalyst support particles, and from about 3.5 to 9.5% by weight of potassium acetate. The catalyst is characterised by having a gold to palladium weight ratio in the range 0.60 to 1.25. Supported Pd/Au catalysts are also known for use in hydrogenation of diolefinic hydrocarbons (U.S. Pat. No. 4,533,779), hydrogenation of acetylene (WO02/078839) and oxidation (U.S. Pat. No. 6,391,821). U.S. Pat. No. 7,709,407 describes the use of supported palladium-gold catalysts for treatment of engine exhaust gases.

The catalysts of the present invention find particular utility in the treatment of exhaust gases from vehicles. However, they may also be useful in other applications.

Vehicle exhausts contain harmful pollutants including carbon monoxide, uncombusted hydrocarbons, oxides of nitrogen, soot and other particulate matter. Catalytic converters and particulate filters have been successfully used to reduce the level of pollutants emitted from vehicles. However, there is a continuing need to reduce pollution further and thus more efficient catalysts are required.

Catalytic converters used in vehicles typically contain supported particles of metal or metal compounds. The metal or metal compound particles may comprise a single metal, e.g. platinum, or they may contain two or more metals, e.g. a combination of platinum and palladium. Metals commonly used in catalytic converters include palladium, platinum, and rhodium.

The composition of vehicle exhaust gases varies depending on a large number of factors including the vehicle, the type of engine, the fuel used, how long the engine has been running, the temperature, weather conditions and others. In addition, all vehicle exhausts contain a mixture of different pollutants. In order to provide the desired level of catalytic performance it is often necessary to include a combination of different catalytic converter components, e.g. catalysed filters or three-way catalysts.

SUMMARY OF THE INVENTION

The invention is a method of making a supported catalytic species comprising an alloy of at least two metals, and also includes a supported catalytic species prepared by the method. The method comprises combining a particulate support material, a solution of a first metal compound, a solution of a second metal compound, and a solution of an alkaline precipitating agent to form a slurry mixture; agitating the slurry mixture to form solids; and contacting the solids with a reducing agent. The first metal in the first metal compound and the second metal in the second metal compound is each independently selected from the group consisting of gold, palladium, platinum, rhodium, iridium, silver, osmium and ruthenium. The first metal is not the same as the second metal. The invention also includes a composition for coating a substrate. The composition comprises a first supported catalytic species and a second supported catalytic species. At least one of the first supported catalytic species and the second supported catalytic species is prepared by the method of the invention.

The invention also includes a catalyst particle that comprises a support material, palladium and gold. At least 70% of the gold and at least 70% of the palladium are present in the form of an alloy of palladium and gold. The average metal crystallite size of the alloy is <15 nm after ageing in air for 48 hours at 750° C. and as measured using X-Ray diffraction. The catalyst particle contains a total of from 0.1-10% by weight of palladium and gold.

The invention also includes a method of preparing a catalysed substrate, and a catalysed substrate prepared by the method. The method comprises combining a particulate support material, a solution of a first metal compound, a solution of a second metal compound, and a solution of an alkaline precipitating agent to form a slurry mixture; agitating the slurry mixture to form solids; contacting the solids with a reducing agent to provide a first supported catalytic species comprising an alloy of the first metal and the second metal; separating and washing the first supported catalytic species; preparing a washcoat by forming a slurry of the first supported catalytic species; and contacting the washcoat with a substrate.

The invention also includes a catalysed substrate that comprises a first supported catalytic species and a second supported catalytic species. At least one of the first supported catalytic species and the second supported catalytic species comprises an alloy of a first metal and a second metal. The first metal and the second metal are each independently selected from gold, palladium, platinum, rhodium, iridium, silver, osmium or ruthenium, and the first metal is not the same as the second metal.

DETAILED DESCRIPTION OF THE INVENTION

Figure 1A:
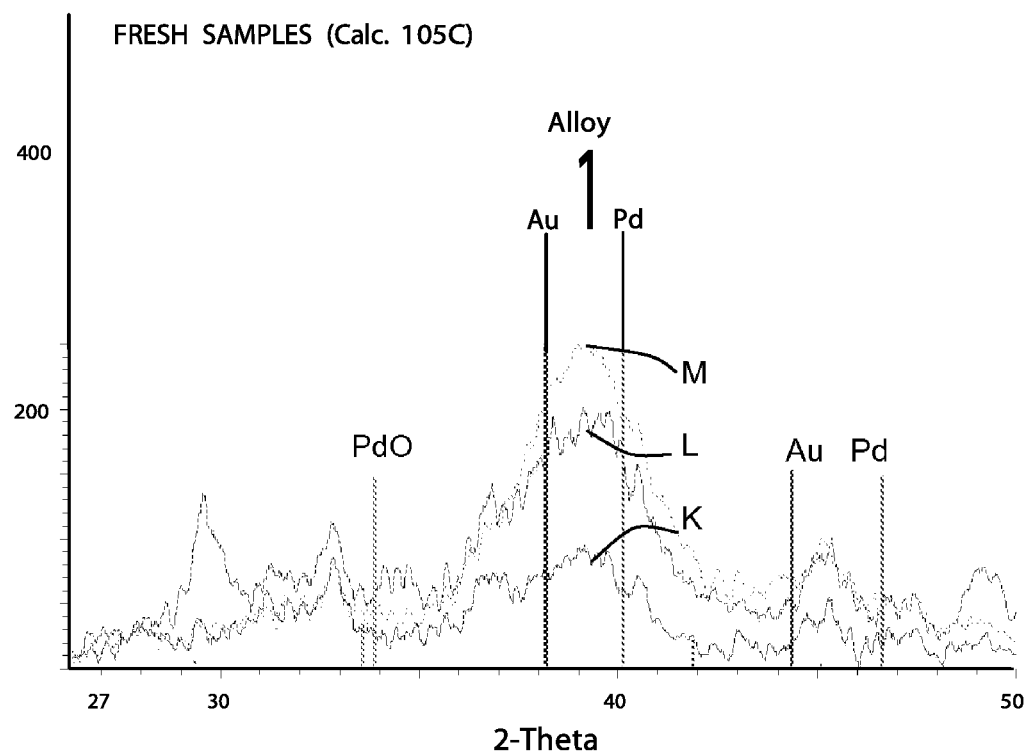
FIG. 1A shows the XRD spectra of fresh sample.

The present invention relates in particular to oxidation catalysts, especially for use in the treatment of exhaust gases from vehicles. However, the invention could be used to make supported catalysts for use in other applications, such as catalysts suitable for manufacturing vinyl acetate monomer (VAM).

The present invention relates in particular to methods of preparing supported catalysts comprising either formed or partially formed alloys of two or more metals. Alloys of two or more metals can show improved catalytic performance, as can be seen in the Examples. The present invention also relates to a catalysed substrate comprising two or more supported catalytic species, wherein at least one supported catalytic species comprises an alloy of two or more metals.

Supported metal catalysts typically comprise the metal or metals in an active catalytic form supported on an inert support material.

There are a number of methods known in the art by which supported metal catalysts can be prepared. In some methods solutions comprising metal compounds are poured onto dry particulate support material, which particulate support material may have been pre-coated onto a substrate. In other methods a slurry of the particulate support material is prepared which is contacted with solutions of metal compounds.

It is an aim of the present invention to provide a method of preparing a catalyst comprising at least two metallic species wherein the catalyst and/or the method of preparing the catalyst offers at least one advantage over catalysts or preparation methods of the prior art.

According to a first aspect of the present invention there is provided a method of making a supported catalytic species comprising an alloy of at least two metals, the method comprising the steps of:
(i) combining a particulate support material, a solution of a first metal compound, a solution of a second metal compound, and a solution of an alkaline precipitating agent to form a slurry mixture;
(ii) agitating the resultant mixture; and
(iii) contacting the solids with a reducing agent,
wherein the first metal in the first metal compound and the second metal in the second metal compound is each independently selected from the group consisting of gold, palladium, platinum, rhodium, iridium, silver, osmium and ruthenium; and wherein the first metal is not the same as the second metal.

The first aspect of the present invention relates to a method of making a supported catalytic species. By supported catalytic species we mean to refer to a catalyst in which the active species is supported on a support material. In this case the catalytic species comprises an alloy of first and second metals supported on a particulate support material.

We refer herein to the first metal and the second metal.

The first metal may be used in the form of a salt to provide the first metal compound. The second metal may be used in the form of a salt to provide the second metal compound.

At the end of the method of the first aspect the first metal is present in the catalytic species supported on the particulate support, at least partly in the form of an alloy with the second metal. Similarly, at the end of the method of the first aspect the second metal is present in catalytic species supported on the particulate support, at least partly in the form of an alloy with the first metal.

The first metal and the second metal is each independently selected from the group consisting of gold, palladium, platinum, rhodium, iridium, silver, osmium and ruthenium.

Preferably the first metal and the second metal is each independently selected from the group consisting of gold, palladium, platinum and rhodium.

In some preferred embodiments the first metal is selected from the group consisting of gold, platinum and rhodium and the second metal is palladium.

In some embodiments the first metal is selected from gold and platinum and the second metal is palladium, e.g. combinations include Pt/Pd and Pd/Au.

In some embodiments suitable for use, e.g. in three-way catalysts or NOx traps, the first metal is palladium and the second metal is rhodium.

In another embodiment also suitable for use, e.g. in three-way catalysts or NOx traps, the first metal is platinum and the second metal is rhodium.

In a further embodiment also suitable for use, e.g. in three-way catalysts or NOx traps, the first metal is platinum, the second metal is palladium and a third metal is rhodium.

In a further embodiment, the first metal is platinum and the second metal is gold.

In one especially preferred embodiment the first metal is gold and the second metal is palladium.

In another especially preferred embodiment, the first metal is platinum and the second metal is palladium.

In some embodiments, the catalyst comprises a third or a subsequent metal. Where present, the third metal is different to the first metal and the second metal. Suitably the third metal is selected from the group consisting of gold, palladium, platinum, rhodium, iridium, silver, osmium and ruthenium.

For some applications, for example when the supported catalytic species is to be used as a diesel oxidation catalyst in a vehicle exhaust system, combinations in an alloy of gold, palladium and platinum are not preferred.

Step (i) of the method of the present invention comprises combining a particulate support material, a solution of a first metal compound, a solution of a second metal compound, and a solution of an alkaline precipitating agent to form a slurry mixture. This may be done in any order.

For example, the particulate support material and the solutions of first metal compound and second metal compound can be combined to form a slurry and this slurry can be added to a solution of alkaline precipitating agent or vice versa. Alternatively, the particulate support material can be slurried in water with the alkaline precipitating agent and the solution of the first metal compound and the second metal compound can be added to it, either as a combined solution of compounds of the first and second metals; as separate streams of solutions of the first metal compound and the second metal compound; or step-wise addition of a solution of the first metal compound followed by a solution of the second metal compound. Further alkaline precipitating agent can be added to achieve a desired pH.

In one embodiment, step (i) comprises the steps of (ia) providing a slurry of a particulate support material; and step (ib) adding to the slurry a solution of a first metal compound, a solution of a second metal compound and a solution of an alkaline precipitating agent.

In some embodiments the first metal compound and the second metal compound may be provided in the same solution. In such embodiments step (i) comprises adding to the slurry a single solution comprising the first metal compound and the second metal compound.

In some embodiments a solution of the first metal compound and a solution of the second metal compound may be mixed together to form a mixed solution which is then added to the slurry. This method is conveniently used when the mixed solution is relatively stable, and may be preferred when the solution of the first metal compound and the solution of the second metal compound contain the same anion. In some embodiments the solution of the first metal compound and the solution of the second metal compound are mixed only immediately before their addition to the slurry of particulate support material. This method is preferred when a mixed solution is unstable, for example when the solution of the first metal compound and the solution of the second metal compound comprise different anions. This can be achieved by pouring the solutions in two separate streams so that they mix just before they enter the vessel containing the slurry, or by using manufacturing equipment in which a Y-piece or other mixing arrangement is included in the feed addition equipment so that the solutions can be stored in and added from separate vessels. In another embodiment the solution of the first metal compound and the solution of the second metal compound may be added to the slurry separately, either in such a way that at least some of the solution of the first metal compound and the solution of the second metal compound are added in alternate portions or such that the solution of the first metal compound is added before the solution of the second metal compound (or vice versa). Whether the solutions are pre-mixed or added separately, they are preferably added to the slurry slowly, and/or in portions. Slow addition enables the pH of the solution to be controlled throughout the addition of the metal solutions.

In some preferred embodiments in which the first metal is gold and the second metal is palladium it is preferred that the solution of the gold compound is added to the slurry before the solution of the palladium compound.

Step (i) further comprises adding to the slurry a solution of an alkaline precipitating agent. The solution of the alkaline precipitating agent may be added before, during or after the addition of the solution of the first and/or second metal compounds. As mentioned above the solution(s) of the first and second metal compounds are suitably added slowly and/or portionwise. The solution of the alkaline precipitating agent is suitably added in an amount and at a rate to control the pH of the solution in the slurry as required.

The particulate support material may be selected from alumina, silica, aluminosilicates, zeolites, titania, zirconia, ceria, carbon or a mixture or a composite of these materials.

Suitable composites include silica-alumina and cerium-zirconium mixed oxides. The particulate support material preferably comprises alumina, optionally with another material for example silica. The particulate support material preferably comprises at least 80%, more preferably at least 90% alumina. Alumina support materials preferably comprise gamma and/or delta alumina. The particulate support material is preferably a powder, more preferably having an average particle size of 1 micron to 1 mm. A typical particulate support material has an average particle size of 1 to 200 microns.

Step (i) preferably comprises forming a slurry in water, preferably in deionised water although organic compounds, such as alcohols, surfactants, wetting agents etc., or combinations of such organic compounds and water can be used. However, water is preferred because it is inexpensive and it does not present any particular difficulties with its disposal.

The amount of solids in the support slurry is desirably selected depending upon the intended combination of metals in the alloy. So for a supported PtPd product, the solids content in the slurry of step (i) can be <25 wt %, whereas for the supported PdAu product, generally solids content of less than about 10% by weight, preferably about 5% is targeted. The slurry is suitably provided at a temperature of 0° C. to 100° C., preferably 20 to 80° C., more preferably about 50 to 60° C. The slurry is preferably slightly alkaline (having a pH of between 8 and 9 when the support is alumina). The pH may be adjusted by adding some of the solution of the alkaline precipitating agent.

The solution of the first metal compound is preferably an aqueous solution, although it can be added as a readily soluble compound. One such gold compound is tetrachloroauric acid. Preferably the solution is prepared using deionised water. The solution of the second metal compound is also preferably an aqueous solution. Preferably it is prepared using deionised water.

In some embodiments the solution of the first or second metal compound comprises an aqueous solution of a gold compound. Suitable gold compounds include gold chloride, tetrachloroauric acid ($HAuCl_4$, sometimes represented as $AuCl_3.HCl$), dimethyl gold acetate, barium acetoaurate, gold acetate, nitrate, sulphate, thiosulphate, Group I and Group II salts of tetrachloroauric acid, such as $NaAuCl_4$ and $KAuCl_4$. The gold compounds may be prepared in situ from suitable reagents.

In some embodiments the solution of the first or second metal compound comprises an aqueous solution of a palladium compound. Suitable palladium compounds include palladium chloride, nitrate, sulphate, acetate, hydroxide or halogen containing palladium compounds such as $H_2PdCl_4$ (sometimes represented as $PdCl_2.2HCl$) and both Group I and Group II salts thereof, such as $Na_2PdCl_4$ and $K_2PdCl_4$. The palladium compounds may be prepared in situ from suitable reagents.

In some embodiments the solution of the first or second metal compound comprises an aqueous solution of a platinum compound. Suitable platinum compounds include platinum chloride, nitrate, sulphate, acetate, hydroxide tetrachloroplatinic acid ($H_2PtCl_4$), hexachloroplatinic acid ($H_2PtCl_6.xH_2O$), potassium tetrachloroplatinate ($K_2PtCl_4$), potassium hexachloroplatinate ($K_2PtCl_6$), and mixtures thereof.

In some embodiments the solution of the first or second metal compound comprises an aqueous solution of a rhodium compound. Suitable rhodium compounds include rhodium chloride, nitrate, sulphate acetate, hydroxide, acetylacetonates, carboxylates, in particular formate or acetate, and carbonyl complexes.

The concentration of the metal compounds in the solution(s) for use in the first aspect of the present invention is dependent on the support material, particularly the isoelectric point of the support material at the pH of deposition and the required metal loading, and is readily determinable by the skilled person depending on a particular combination of first metal, second metal and particulate support material.

The solution of the alkaline precipitating agent preferably comprises an aqueous solution of a metal salt, preferably an alkali metal or alkaline earth metal salt. Typical precipitating agents which may be used are known in the art and include metal carbonates, bicarbonates and hydroxides. Preferably the solution of alkaline precipitating agent is an aqueous solution of potassium carbonate or potassium bicarbonate.

The solution or solutions comprising the first metal compound and the second metal compound are often acidic and addition to the slurry causes the pH of the slurry to fall. In some preferred embodiments during the addition of the solutions to the slurry, the pH of the slurry is maintained at (or frequently adjusted to) a desired range. The desired range may depend on the particular combination of metals used. Steps (i) and (ii) are pH independent. However, as can be seen in the Examples, one preferred way of preparing a PdAu product is to maintain the pH during step (i) at between 6 and 7, as this produces a more active catalyst (compare activity results of Examples 11C and 11D). Control of the pH may be accomplished by addition of the solution of alkaline precipitating agent in sufficient quantities and sufficiently frequently.

Suitably during step (i) the temperature is maintained between 0° C. and 100° C., preferably between 20° C. and 80° C., suitably between 50° C. and 60° C. Preferably the slurry is stirred continuously during step (ii).

Step (ii) comprises agitating the resultant mixture. This may be achieved by any suitable means and suitably ensures that the first metal compound, the second metal compound and the alkaline precipitating agent are mixed throughout the slurry. This allows the alkaline precipitating agent to react with the metal compounds.

The mixture is preferably stirred for a period sufficient to allow the first metal compound and the second metal compound to be hydrolysed. Usually the hydrolysis leads to the formation of precipitated compounds which may be hydroxides of the first metal and the second metal. This period is preferably at least 30 minutes. A period of approximately one hour has been found to be a suitable time for this step.

During step (iii) the temperature is preferably maintained at between 0 and 100° C., preferably between 20 and 80° C., more preferably between 50 and 60° C. Suitably the temperature is maintained to be approximately constant throughout step (iii).

For the PdAu embodiment, hydrolysis of the metal compounds may lead to an increase of the pH of the solution in the slurry. The desired final pH after hydrolysis is preferably within the range 7 to 8, particularly about 7.5. In some preferred embodiments, in which the first metal compound is gold and the second metal compound is palladium and the support material is alumina, silica-alumina, ceria or ceria-zirconia, the pH of the mixture after step (i) is about 6.25. This allows a final and stable pH of 7.5 to be achieved during hydrolysis. If necessary the pH can be adjusted by addition of the solution of the alkaline precipitating agent or an acid, as required. In preferred embodiments the pH during step (ii) is maintained between 4 and 9. Preferably at the end of step (ii) the solution in the slurry has a pH of between 7 and 8 (see Example 11D). The mixture is preferably maintained at pH 7.5 for about 20 minutes at the end of step (ii) by adding to the mixture sufficient of the alkaline precipitating agent or of an acid to bring the pH to the required value. Generally, any acid may be used. Hydrochloric and nitric acids are examples of useful acids. If an acid is added to adjust the pH then it is preferred that the acid is one which forms at least one of the anions already present in the solution.

Step (iii) comprises contacting the solids with a reducing agent. Preferably step (iii) involves adding a reducing agent to the solids obtained in step (ii), preferably with stirring. The reducing agent is preferably either a liquid or a liquid solution of a reducing agent. A hydrazine solution is a preferred reducing agent, although a wide range of alternative reducing agents may be used. Examples include ascorbic acid, $NaBH_4$, organic acids, aldehydes or alcohols, polyols, $H_3PO_2$, $Na_2H_2PO_2$, $H_2SO_4$ or salts thereof for example sodium formate. Gaseous reducing agents for example hydrogen gas or materials that may be decomposed in-situ to liberate hydrogen may also be used. Additional water may be added at this stage if required.

Preferably in step (iii) a liquid composition comprising a reducing agent is added to the solids obtained in step (ii).

Although not essential, in embodiments a step may be introduced between steps (ii) and (iii) comprising separating the solids from the mixture at the end of step (ii). This may be achieved by any suitable method, such as will be known to the person skilled in the art. What determines whether or not the step of separating the solids from the mixture is required is to what extent 100% deposition of metal in step (ii) has been achieved. For example, in Example 11C, substantially 100% metal deposition is achieved and so the method can pass to step (iii) without an intermediate step of separating the solids from the mixture. However, and for example, in Example 11D, where less than 100% metal deposition is obtained, without a step of separating the solids from the mixture prior to step (iii), step (iii) would cause remaining solute metal present in the supernatant to "crash" out of solution and to form relatively large and inactive particles on the support material. By separating the solids from the mixture, solute metal remaining in the supernatant can be recovered and reused.

For the purposes of performing the step of separating the solids from the mixture, in some embodiments the slurry is allowed to settle by reducing or ceasing agitation and the supernatant solution, containing soluble metal compounds, is removed from the separated solids, for example by decanting. The solids could be separated from the supernatant liquid in any other way, for example by filtration or centrifugation, and deionised water may then be added to the thus isolated solids to form a high percentage solid slurry for use in step (iii).

The solids obtained in the separating step need not be very dry, that is the particles may still be wet and may form a loose slurry, but it is desired that most of the liquid that was present in the slurry has been removed. Removal of the liquid in this way means that metal compounds that remain in solution at the end of step (ii), for example if they have not been hydrolysed, are not present in the mixture when the reducing agent is added.

Suitably in the step of separating solids at least 70 wt % of the liquid present in the mixture at the end of step (ii) is removed from the solid-containing mixture, preferably at least 80 wt %, for example at least 90 wt %.

Preferably after step (iii) the slurry is allowed to settle and then the supported catalytic species is separated and washed until free of unwanted compounds. All of the solutions used in the preparation may be recovered and reused or treated to recover any metals contained therein.

Preferably after step (iii) the first and second metals have been reduced and are supported on the particulate support material in the form of an alloy. This allows the catalyst to be washed to remove unwanted compounds, for example halide ions without the risk of removing supported first or second metals or metal compounds.

The method of the first aspect of the present invention may further comprise the step of separating and washing the solid supported catalyst obtained in step (iii).

After step (iii), and any subsequent separation and washing steps that may be necessary have been carried out, the supported catalyst may be dried and/or calcined and/or aged to form a catalyst powder.

Drying typically involves heating the catalyst in air at a temperature of 80 to 150° C., preferably about 100° C. for up to 24 hours, or until dry. As defined herein dryness is defined as the state in which a portion of the material being dried withdrawn from the bulk remainder thereof undergoes substantially no weight loss when heated to 500° C. for 15 minutes.

Calcination typically involves heating the catalyst in air at a temperature of 400° C. to 600° C., preferably 450° C. to 550° C., for example about 500° C., for a period of 0.1 to 8 hours, typically 0.5 to 4 hours, for example about 1 hour.

Ageing typically involves heating the catalyst at a temperature of 500° C. to 900° C., preferably 700 to 800° C., for example about 750° C. for at least 1 hour, preferably at least two hours or 4 hours. One application for supported catalyst prepared using such ageing regime is on-board diagnostics (OBD) emission standards, which require that a vehicle includes means for real-time monitoring of catalyst performance to determine whether a catalyst continues to meet the emission standards set. When it is determined that a catalyst fails in use, a warning signal is issued by the OBD system. The activity of fresh, i.e. un-aged, catalysts can change more rapidly as they first become exposed to exhaust gases than for a catalyst that has been aged through use. Such two stage rates of change of activity during ageing of fresh catalysts can make designing and programming OBD systems to determine catalyst failure difficult. By "pre-stressing" a catalyst through such an ageing regime as is described above, the rate of catalyst deactivation through ageing may be more predictable and more easily integrated into an OBD system.

Drying and/or calcination are optional steps. Whether any of these steps is carried out will depend on the nature of the first and second metals. In some embodiments drying and calcination are not necessary at this stage and the catalyst obtained after step (iii) can be used directly in subsequent wet processing steps. For example, the wet catalyst obtained after step (iii) can be used directly in a milling or coating process. This offers significant advantages in terms of energy savings and reducing the number of steps required to form a finished catalysed substrate.

In preferred embodiments the supported catalytic species is not dried directly after step (iii), that is before it is used in a further wet processing step, for example a coating process.

In an embodiment of the first aspect of the present invention, there is provided a method of making a catalyst comprising gold and palladium on a particulate support material, by the steps of:

a) preparing a slurry of said particulate support in water at a temperature of 20-80° C. and agitating;
b) preparing a solution A of a gold compound and a solution B of a palladium compound;
c) preparing a solution C of an alkaline precipitating agent;
d) adding solution A and solution B to said slurry, with agitation, with sufficient of solution C to maintain the pH of said slurry within the range 6.0-7.0;
e) repeating the addition steps in (d) until all of the solution A and B required for the catalyst has been added;
f) stirring the resulting slurry/metals mixture for sufficient time to hydrolyse the gold and palladium compounds;
g) allowing the slurry to settle and removing the supernatant liquid containing non-deposited metals;
h) adding to the solids a reducing agent;
i) stirring the mixture, separating the solid catalyst and washing.

In the case of gold and palladium containing catalysts, by maintaining the pH of the mixture to within the range 6.0-7.0, optionally pH 6.5-7.0 during step (e), it has been found that the resulting catalyst is more active for oxidation of, among others, carbon monoxide and/or hydrocarbons and/or oxides of nitrogen (NOx).

Without wishing to be bound by theory, it is believed that the method of the invention has significant benefits over some of the methods described in the art. In U.S. Pat. No. 5,274,181 for example, the metal compounds are introduced to the support using incipient wetness impregnation, i.e. such that the solution volume is calculated to be approximately equal to the pore volume of the support. This prior art procedure introduces the solutions of metal compounds into the pores of the support before the insoluble metal compounds are formed so that deposition on the support takes place under acidic conditions.

The method according to the first aspect of the present invention may be described in the art as a deposition-precipitation method. In the deposition-precipitation method of the present invention, the deposition of metal compounds on the support preferably takes place in conditions of controlled pH allowing greater control over the metal species which are deposited on the particulate support material. The iso-electrical properties of the support are important in determining the interaction of the metal compounds with the particulate support material, for example alumina. When the first metal is gold and the second metal is palladium, it has been found that when the final pH of the mixture after hydrolysis is about 5, up to 100% of the gold species can be deposited on the support. At a pH above the isoelectric point, the support tends to repel the gold compounds, effectively limiting the amount of gold that can be deposited on the support. However, at a higher pH (above about 7), the gold hydroxides formed are of smaller particle size than when the precipitation takes place at lower pH. The deposition of a large amount of gold particles at a small particle size therefore entails a careful balance of the pH of the solutions during preparation of the catalyst. When the pH of the solution at the end of the hydrolysis step is about 7.5 (±0.1) the particle size of the gold and palladium particles formed and the amount of gold deposited on the support (about 60-65%) is optimised. Using the method of the invention some of the palladium and gold compounds remain in solution and are not deposited on the support, usually up to 40% of the metal compounds remain in solution and are recovered and reused.

According to a second aspect of the present invention there is provided a supported catalytic species obtainable by a method according to the first aspect of the invention.

The supported catalytic species of the second aspect of the present invention comprises an alloy. By this we mean that the first metal and the second metal are both present in a metal crystallite that forms on and is supported by the particulate support material. "Alloy" herein may be further defined in binary systems as an XRD signal that lies in between the standard XRD signal location of each of the two component metals (i.e. metal e.g. $Au_0$ or $Pd_0$ not signal for any metal compound). See FIGS. 1 and 2.

In some embodiments the supported catalytic species may comprise an alloy of the first metal, the second metal and a third (or a subsequent) metal. The supported catalytic species may also comprise some of the first metal and/or some of the second metal and/or (when present) some of the third (or subsequent) metal that is not in the form of an alloy. The amount of each metal that is present as an alloy may change following further subsequent processing steps, for example following a later drying or calcination step or after an ageing step prior to use or through ageing when in use.

Suitably at least 10 wt % of the first metal is present in the form of an alloy, preferably at least 25 wt %, preferably at least 50 wt %, suitably at least 70 wt %, for example at least 80 wt %, at least 90 wt % or at least 95 wt %.

Suitably at least 10 wt % of the second metal is present in the form of an alloy, preferably at least 25 wt %, preferably at least 50 wt %, suitably at least 70 wt %, for example at least 80 wt %, at least 90 wt % or at least 95 wt %.

When present, preferably at least 10 wt % of the third metal is present in the form of an alloy, preferably at least 25 wt %, preferably at least 50 wt %, suitably at least 70 wt %, for example at least 80 wt %, at least 90 wt % or at least 95 wt %.

For brevity, preferred features of the second aspect of the invention are as set out in connection with the first aspect of the present invention.

Preferably the first metal, the second metal and (where present) the third (or subsequent) metal together comprise at least 0.01 wt % of the supported catalyst (i.e. the total weight of metallic species and particulate support material). Preferably they together comprise at least 0.05 wt %, suitably at least 0.1 wt %, preferably at least 0.25 wt %, suitably at least 0.3 wt %, for example at least 0.4 wt % or at least 0.5 wt %.

Preferably the first metal, the second metal and the third metal when present together comprise up to 30 wt % of the supported catalyst, suitably up to 25 wt %, preferably up to 20 wt %, more preferably up to 15 wt %, suitably up to 10 wt %, for example up to 7.5 wt % or up to 6 wt %.

The weight ratio of the first metal to the second metal is suitably from 20:1 to 1:20, preferably from 10:1 to 1:10, more preferably from 7:1 to 1:7, preferably from 5:1 to 1:5, for example from 4:1 to 1:4 or from 3:1 to 1:3.

The desired amount of each metal may be obtained by selecting appropriate concentrations of the metal compounds used in the solutions added in step (ii) and adding these in an appropriate ratio.

The ratio of the first metal to the second metal and (when present) to the third (or subsequent) metal will typically be chosen to provide a desired catalytic activity in the reaction in which the catalyst is to be used.

In some embodiments in which the first metal is gold and the second metal is palladium the weight ratio of gold to palladium is preferably from 10:1 to 1:10 such as 5:1 to 1:5, more preferably from 4:1 to 1:4, suitably from 3:1 to 1:3, preferably from 2:1 to 1:2, for example from 1.5:1 to 1:1.5.

In some embodiments in which the first metal is platinum and the second metal is palladium, the weight ratio of platinum to palladium is preferably from 20:1 to 1:20, such as 10:1 to 1:10 or 5:1 to 1:5, preferably from 4:1 to 1:4. In some embodiments the ratio of platinum to palladium is from 3.5:1 to 2.5:1. In some embodiments the ratio of platinum to palladium is form 1.5:1 to 1:1.5.

In some embodiments in which the first metal is rhodium and the second metal is palladium or platinum the weight ratio of rhodium to palladium is preferably from 20:1 to 1:20 such as 10:1 to 1:10 or 5:1 to 1:5, suitably from 3:1 to 1:3.

The supported catalyst of one especially preferred embodiment of the invention in which the first metal is gold and the second metal is palladium will now be further described.

Using the method of the first aspect of the invention, and using gold as the first metal and palladium as the second metal it has been found that it is possible to prepare a catalyst in which, following reduction of the catalyst, the majority of the gold and palladium is present in the form of a gold-palladium alloy. This alloy is obtainable directly from step (iii) without the need for subsequent drying, calcining or ageing steps. The presence of the alloy has been detected by X-Ray diffraction (XRD) (see FIGS. 1 and 2).

According to a third aspect, the present invention provides a catalyst particle comprising a support material, palladium and gold characterised in that ≥70%, preferably >80%, and often ≥90% of the gold and ≥70%, preferably >80%, and often ≥90% of the palladium are present in the form of an alloy of palladium and gold, the average metal crystallite size of the alloy is <15 nm after ageing in air for 10 hours at 750° C. and as measured using X-Ray diffraction and the catalyst particle contains a total of from 0.1-20% by weight of palladium and gold. The person skilled in the art will appreciate that the practical limit of particle size detectable by XRD is approximately 2 nm. Therefore, there may be particles of gold, palladium or of gold-palladium alloy smaller than about 2 nm which are not detected by this technique. When it is stated herein that the gold and palladium forms an alloy, it is meant that both gold and palladium are present in the metal crystallite forming the metal particles on the support material.

The particle size of the alloy, measured by XRD, is generally <20 nm, such as <10 nm, typically about 3-4 nm, in a fresh catalyst, before ageing. Upon ageing at 750° C. some sintering of the metal particles occurs and the average particle size becomes larger, usually <25 nm, such as <15 nm, typically from about 5-10 nm, preferably from 6-8 nm. A particular and surprising benefit of the method according to the present invention is that the gold/palladium alloy particle size in catalysts after ageing at 750° C. for 15 hours has been determined by X-ray diffraction (XRD) to be about 6-7 nm over a range of metal contents from 0.5-6 wt %. This means that it is possible to increase the activity of the catalyst by increasing the loading of the metals on the catalyst without forming larger, less active particles. That is to say, the number of active sites on the catalyst may be increased directly by increasing the amount of metal in the catalyst. Surprisingly, non-calcined material produced using the preparation method of the invention gives a gold/palladium alloy that shows excellent catalytic activity performance for hydrocarbon and carbon monoxide oxidation. The alloy was observed by XRD in the powdered product, after drying at about 100° C. XRD patterns of the prepared material show similar patterns in the freshly prepared material and after calcinations at 500° C. There is therefore no need to calcine the product at high temperatures in order to produce material useable in auto-catalyst applications, where the requirement is for low light-off temperature and high conversion for CO oxidation. That is, the uncalcined material can be used directly in a washcoat slurry and remains fixed to the particulate support material: the Pd/Au is fixed as an alloy at relatively low temperatures.

The catalysts preferably contain gold and palladium in a weight ratio of from 10:1-1:10. The total amount of gold and palladium metals in the catalyst is preferably between 0.1% and 10%, more preferably in the range from 0.5% to 6% by weight based on the total weight of metal compounds plus support.

Catalysts may be made using the method of the invention comprising gold and palladium in the form of an alloy. It has been found that using the method of the invention, it is possible to make novel catalyst particles where the majority or, in most cases, all of the gold which is measurable by XRD is present in the form of an alloy with palladium which is a catalytically active form of gold and is resistant to deactivation. The majority of the gold present in the catalyst is alloyed with palladium; it has been found that at least 70%, preferably >80%, and often ≥90% of the gold and at least 70%, preferably >80%, and often ≥90% of the palladium is present in the catalyst in the form of a gold/palladium alloy. Preferably at least 95% of the gold is present in alloyed form. We have found that very little of the gold in the finished catalyst made according to the method of the invention is not alloyed with palladium. This is important because unalloyed gold is more susceptible to react with sulphur and therefore is more likely to be deactivated by contact with sulphur-containing gases. Therefore, preferred catalysts of the invention contain less than 10%, more preferably less than 5% of gold in a form which is not alloyed with palladium. In preferred embodiments the amount of gold in a form which is not alloyed with palladium is not readily detectable by X-Ray diffraction (XRD). The alloy may contain gold and palladium in a ratio in the range from 1:10-10:1. In many applications, the alloy preferably contains from 20-80% palladium and 80-20% gold (by weight), more preferably from 40-60% palladium and 60-40% gold.

The supported catalyst particles prepared by the method of the first aspect of the present invention may be used in the form of a powder (having an average particle diameter less than 1 mm, especially less than 0.1 mm) or they may be incorporated into larger catalyst compositions or catalysed substrates. A catalysed substrate comprises a catalyst and a support structure for the catalyst referred to herein as a "substrate". Substrates typically have a minimum dimension greater than about 1 mm and may take the form of shaped particles such as tablets, extruded cylinders, lobed shapes, rings, spheres etc., as typically used to form beds of catalyst particles. Alternatively, the substrate may comprise a structure such as a monolith, honeycomb, minilith or tube. The catalysed substrate may comprise a mixture containing the catalyst powder and other ingredients which is then formed into the catalysed substrate by methods such as extrusion, tabletting or granulation. Alternatively, the substrate may comprise a substrate material which may be a metal or a refractory material to which the catalyst particles are applied, usually as a layer or washcoat at least partially covering the substrate. As is known in the art, such catalysed substrates may comprise more than one catalyst or other functional material. Each such catalyst or functional material may be present as a layer or washcoat overlying the substrate, i.e. multiple layers in which each layer comprises a different catalyst. In a preferred physical form of particular application in treating exhaust gases from stationary and mobile, e.g. vehicular, emission sources the catalyst is provided as a coating on a honeycombed substrate monolith. Such substrate monoliths are known in the art and are made from ceramic or metal materials. They include so-called flow-through substrate monoliths or filtering substrates, such as wall-flow filters.

Preparation of catalysed substrates by washcoating a catalyst washcoat mixture onto a substrate is well known in the art, particularly for the manufacture of catalysed substrate monoliths for use in the treatment of diesel- or gasoline-fuelled engines, particularly for vehicle engines. The washcoat mixture typically comprises but is not limited to support materials of alumina, silica, aluminosilicates, zeolites, titania, zirconia, ceria, carbon or a mixture or a composite of these materials such as ceria-zirconia or alumina-silica as is known in the art.

Alternatively, the catalysed substrates may be prepared by tabletting, extrusion or other means using a composition comprising the catalyst particles of the invention and usually other ingredients such as lubricants, pore formers etc.

The supported catalytic species according to the second aspect of the invention may be incorporated into a catalysed substrate by coating a substrate, or a surface of a material applied to the substrate, with a composition comprising the supported catalytic species of the second aspect of the present invention or catalyst particles according to the third aspect of the present invention, followed by drying if required. It is a particular benefit of the method of the first aspect of the invention that when the catalyst powder or "wet cake" resulting from the method according to the first aspect of the invention has been reduced in situ, it may be used to form a washcoat without the need for drying or calcining because the metals in their reduced form are not susceptible to being removed by the process of dispersing in the washcoat formulation.

According to a fourth aspect of the present invention, there is provided a method of preparing a catalysed substrate, the method comprising the steps of:
 (i) combining a particulate support material, a solution of a first metal compound, a solution of a second metal compound, and a solution of an alkaline precipitating agent to form a slurry mixture;
 (ii) agitating the resultant mixture;
 (iii) contacting the solids with a reducing agent to provide a first supported catalytic species comprising an alloy of the first metal and the second metal;
 (iv) separating and washing the first supported catalytic species;
 (v) preparing a washcoat by forming a slurry of the first supported catalytic species; and
 (vi) contacting the washcoat with a substrate.

The fourth aspect of the present invention relates to a method of preparing a catalysed substrate. By catalysed substrate we mean to refer to an article that comprises an active catalyst. Suitable substrates for use in this aspect of the invention are described hereinabove. The catalysed substrate is suitably the article which comes into contact with the reactants in the reaction or reactions which it catalyses.

The catalysed substrate suitably acts as a heterogeneous catalyst. Preferably it catalyses a reaction in the gaseous phase. Preferably the catalysed substrate comprises part or all of a catalytic converter or exhaust system comprising two or more catalysed substrate monoliths, wherein the catalyzed substrate resulting from the fourth aspect of the invention comprises a first catalysed substrate for use on a vehicle. More preferably the catalysed substrate comprises part or all of a catalytic converter or exhaust system for use on a vehicle having a diesel engine.

In preferred embodiments of the method of the fourth aspect of the present invention, there is no calcination step between step (iv) and step (v). Preferably there is no drying step between step (iv) and step (v). Suitably the washed supported catalyst obtained after step (iv) is used directly in step (v) to form the washcoat slurry. This offers significant advantages in terms of reducing the overall complexity of the process and reducing the energy used. Drying and calcining involve heating at high temperatures for long periods and thus the method of the present invention which reduces the number of such steps has an improved environmental profile.

Step (v) of the method of the fourth aspect comprises preparing a washcoat by forming a slurry of the supported catalytic species according to the second aspect of the present invention or catalyst particles according to the third aspect of the present invention.

Suitably the slurry is prepared by stirring the supported catalytic species in a liquid. Suitably the liquid is an aqueous liquid. It may comprise a further water miscible solvent, for example, a monohydric or polyhydric alcohol. Preferably the liquid is water, most preferably it is deionised water.

Preferably the supported catalytic species comprises 5 to 40 wt % of the slurry, such as 10-30 wt % solids of the slurry or 20-30 wt % solids present in the slurry.

In a particularly preferred embodiment one or more further second supported catalytic species different from the first supported catalytic species may be added to the slurry in step (v). That is the first and second (and any subsequent, i.e. third, fourth etc.) supported catalytic species are present in the same washcoat layer.

Thus step (v) may involve preparing a washcoat by forming a slurry of a first supported catalytic species according to the second aspect of the present invention or the catalyst particle according to the third aspect of the present invention and one or more further second supported catalytic species made according to the first aspect of the invention different from the first supported catalytic species.

The one or more further supported catalytic species may be prepared by the method of the first aspect of the invention and/or they may be prepared by a different method.

Suitable alternative methods will be known to the person skilled in the art. However, it is made, the second supported catalytic species suitably comprises one or more metals which is supported on a particulate support material. Where the or each second supported catalytic species comprises two or more supported metals, the two or more supported metals may or may not comprise an alloy thereof.

Preferred second supported catalytic species for use in the particularly preferred embodiment of the fourth aspect of the present invention include Pt only, Pd only, Rh only, or combinations of Pt/Pd/Rh, Pt/Pd, Pd/Au, Pt/Au, Pt/Rh or Pd/Rh. Suitable support materials are described hereinabove and include alumina, silica-alumina, ceria and ceria-zirconia. Suitable methods of making such second supported catalytic species are known to the person skilled in the art, such as wet impregnation of a salt solution followed by drying and calcining, co-precipitation methods, solid state combinations etc. By "different from the first supported catalytic species" in the definition of second supported catalytic species, it is meant to include components having the same metal or combination of metals, but at different loadings or weight ratios from the first supported catalytic species. So, for example, in a preferred embodiment wherein the first supported catalytic species comprises an alloy of both platinum and palladium and the total weight ratio of platinum and palladium present in the first supported catalytic species is 2:1, a second supported catalytic species comprising both platinum and palladium (whether present in the form of an alloy or not) at a weight ratio of 1:1 represents "a second supported catalytic species different from the first supported catalytic species".

Step (vi) of the method of the fourth aspect of the invention involves contacting the washcoat with a substrate.

The substrate comprises a base structure onto which the washcoat is applied. The washcoat comprises a particulate material on which the catalyst is carried, i.e. the supported catalytic species or catalyst particles. The substrate is a macrostructure which carries the particulate material. The substrate may be shaped to provide a suitable surface to enable the catalyst to interact efficiently with the reactants during the catalytic reaction. For example, it suitably has a large surface area and may be shaped to direct the flow of reactants, especially gaseous reactants.

Suitable substrates are described hereinabove. In especially preferred embodiments for use in treating vehicular exhaust gases, the substrate comprises a honeycomb substrate monolith having a flow through or wall-flow configuration.

Most preferably the substrate is selected to be useful in the catalysis of reactions which reduce the level of pollutants in vehicle exhaust gases.

In step (vi) the washcoat is contacted with the substrate. Suitably the washcoat is coated onto the substrate. This may be carried out by any suitable means. Such means will be known to the person skilled in the art. For example, the Applicant/Assignee's WO 2011/080525A1 or WO 99/47260A1 disclose methods of applying washcoat to wallflow filter substrate monoliths and flow through substrate monoliths.

The washcoat may be coated onto all or part of the substrate. In some embodiments a particular portion only of the substrate may be coated. Other portions may be coated with a different washcoat comprising a different catalyst. This may enable different regions of the substrate to have different catalytic activity.

In some embodiments a second washcoat layer may be coated onto the substrate comprising a different catalyst. An advantage of such an embodiment is that it allows multiple supported catalytic species to be applied in a single washcoat.

In some preferred embodiments step (v) involves contacting the substrate with a coating composition of the fifth aspect of the present invention. Following step (vi) the catalysed substrate thereby obtained may be dried. This is suitably carried out by heating under standard conditions at a temperature of 80 to 150° C. for a period of 0.1 to 6 hours, for example it may be heated at approximately 100° C. for about 30 minutes.

The catalyst may be calcined. Calcination typically involves heating at a temperature of 400 to 600° C. for a period of 0.1 to 8 hours.

In some embodiments of the method of the fourth aspect of the present invention only one calcination step is used. The method of the fourth aspect of the present invention preferably does not include multiple calcination steps. This offers considerable advantages over methods of the prior art in terms of process efficiency and reduction in energy used to make the catalytic structure. Significant cost savings are therefore provided.

In some preferred embodiments in which step (vi) involves contacting the substrate with a coating composition of the fifth aspect of the present invention, the method of the fourth aspect of the invention may provide a catalysed substrate comprising at least two supported catalytic species using a method, which includes only one washcoat application and one calcining step.

Because such methods do not require the application of multiple washcoats and multiple calcination steps some of the problems of the prior art associated with migration of metal species are reduced or avoided. Catalysed substrates prepared by the method of the fourth aspect of the present invention have been shown to have improved performance. In particular, such catalysts have been shown to provide an improvement in the oxidation of carbon monoxide and hydrocarbons emitted in exhaust gas of vehicles.

In some preferred embodiments in which the first metal is gold and the second metal is palladium, the method of the fourth aspect of the present invention may provide a process for making a catalysed substrate, comprising the steps of
a) preparing a slurry of a particulate support in water at a temperature of 20-80° C. and agitating;
b) preparing a solution A of a gold compound and a solution B of a palladium compound;
c) preparing a solution C of an alkaline precipitating agent;
d) adding solution A and solution B to said slurry, with agitation, with sufficient of solution C, to maintain the pH of said slurry within the range 6.0-7.0;
e) repeating the addition steps in (d) until all of the solution A and B required for the catalyst has been added;
f) stirring the resulting slurry/metals mixture for sufficient time to hydrolyse the gold and palladium compounds;
g) allowing the slurry to settle and removing the supernatant liquid containing non-deposited metals;
h) adding to the solids a reducing agent;
i) stirring the mixture, separating the solid catalyst and washing;
j) adding the washed solid catalyst to a washcoat formulation to form a catalyst washcoat mixture;
k) coating said washcoat mixture onto a catalyst support unit to form a coated catalyst support unit; and
l) drying said coated catalyst support unit and optionally activating the catalyst to form a catalysed substrate.

According to a fifth aspect of the present invention there is provided a coating composition for a catalysed substrate comprising a first supported catalytic species and a second supported catalytic species, wherein the first supported catalytic species is prepared by the method of the first aspect according to the invention and the second supported catalytic species is different from the first supported catalytic species.

In some embodiments the second supported catalytic species comprises a single metal on a particulate support material. Suitable particulate support materials are as defined in relation to the first aspect.

Alternatively, the second supported catalytic species may be prepared by another method. Suitable methods will be known to the person skilled in the art.

In some embodiments, the second supported catalytic species comprises a single metal selected from gold, platinum, palladium and rhodium.

In some embodiments the second supported catalytic species comprises gold.

In some embodiments the second supported catalytic species comprises platinum.

In some embodiments the second supported catalytic species comprises palladium.

In some embodiments the second catalytic species comprises rhodium.

In some embodiments, the second supported catalytic species comprises more than one metal. Suitably it may comprise two metals.

Preferably in such embodiments the second supported catalytic species is prepared by the method according to the first aspect. Preferred features of the second supported catalytic species are as defined in relation to the first and second aspects.

In some embodiments, the first supported catalytic species comprises a combination of gold and palladium and the second supported catalytic species comprises a combination of palladium and platinum.

In some embodiments, the first supported catalytic species comprises a combination of gold and palladium and the second supported catalytic species comprises a combination of gold and palladium.

In such embodiments the weight ratio of gold to palladium in the first supported catalytic species is different from the weight ratio in the second supported catalytic species. For example, a weight ratio of 10:1 to 1:10 (gold:palladium) may be used in the first supported catalytic species and a weight ratio of 10:1 to 1:10 may be used in the second supported catalytic species, wherein the gold:palladium weight ratio in the first supported catalytic species is different from that in the second supported catalytic species.

In some embodiments, the first supported catalytic species comprises a combination of platinum and palladium and the second supported catalytic species comprises a combination of platinum and palladium.

In such embodiments the ratio of platinum to palladium in the first supported catalytic species is different from the ratio in the second supported catalytic species. For example a weight ratio of 20:1 to 1:20 (platinum:palladium) may be used in the first supported catalytic species and a weight ratio of 20:1 to 1:20 may be used in the second catalytic species, wherein the gold:palladium weight ratio in the first supported catalytic species is different from that in the second supported catalytic species.

In some embodiments a third supported catalytic species or a fourth or fifth supported catalytic species may be provided. Preferred features of these further supported catalytic species are suitably as defined in relation to the second supported catalytic species.

Other optional ingredients may be added to the slurry prepared in step (v) of the method of the fourth aspect of the present invention, for example viscosity modifiers, pH buffers, surfactants etc.

The preparation of a washcoat formulation is a standard technique known to the person skilled in the art.

According to a sixth aspect, the present invention further provides a catalysed substrate obtainable by the method of the fourth aspect of the present invention.

According to a seventh aspect, the present invention provides a catalysed substrate comprising a first supported catalytic species and a second supported catalytic species, wherein at least one of the first supported catalytic species and the second supported catalytic species comprising an alloy of a first metal and a second metal, wherein the first metal and the second metal are each independently selected from the group consisting of gold, palladium, platinum, rhodium, iridium, silver, osmium and ruthenium; and wherein the first metal is not the same as the second metal.

In an eighth aspect, the present invention further provides the use of a supported catalytic species obtainable by the method of the first aspect of the present invention or a catalysed substrate obtainable by the method of the fourth aspect of the present invention to catalyse a chemical reaction.

The supported catalytic species, catalyst particle or catalysed substrate may be used to catalyse a variety of different chemical reactions. The catalytic activity may depend on the nature of the first metallic species, the nature of the second metallic species, the particulate support material, the nature of any further catalysts present, the ratio of the metallic species present, and the shape and structure of the substrate. Other factors may also have an effect. The skilled person will be able to vary features of the method of the present invention in order to optimise the performance of the supported catalyst or catalysed substrate obtained for use in a particular reaction.

In some embodiments in which the first metal comprises rhodium and the second metal comprises palladium the supported catalytic species may be useful in the reduction of oxides of nitrogen found in engine exhaust gases, particularly as components of a three-way catalyst or of a NOx adsorber catalyst, also known as a NOx trap.

In some embodiments in which the first metal is selected from platinum and gold and the second metal is palladium the supported catalytic species may be useful in the oxidation of carbon monoxide and hydrocarbon compounds found in engine exhaust gases or of oxidising oxides of nitrogen in engine exhaust gases. Such catalysts can be referred to as oxidation catalysts. In certain configurations, these supported catalytic species comprise a component of a NOx trap.

NOx oxidation can be used to increase performance of downstream processes, such as the beneficial oxidation of NO to $NO_2$ to provide an approximately 1:1 ratio thereof within the population of NOx in the exhaust gas to which exhaust gas can be added a nitrogenous reductant or precursor thereof, e.g. urea, to form an exhaust gas mixture, which exhaust gas mixture is then passed over a catalyst for selectively catalysing the reduction of the NOx. The latter catalysts are often referred to as selective catalytic reduction or SCR catalysts and typically include transition metal promoted zeolites.

Preferred transition metals include iron, copper, cerium and combinations of any two or more thereof. Preferred zeolites include ZSM-5, ferrierite, Beta, CHA and ZSM-34. For further details, please refer to Applicant/Assignee's WO 2008/132452 A2.

Catalysed substrates comprising NOx traps, three-way catalysts or oxidation catalysts comprising supported catalyst species according to the invention can be disposed upstream of a separate substrate monolith (either a flow through substrate monolith or a wall flow filter) comprising a SCR catalyst. By contacting the upstream NOx trap, three-way catalyst or oxidation catalyst with a rich exhaust gas, ammonia may be generated in situ.

Preferably the catalysed substrate is used to catalyse an oxidation reaction. Preferably it is used to catalyse the oxidation of one or more components of the exhaust gases from the combustion of fuel in a vehicle engine. More preferably, it is used to catalyse the oxidation of one or more components of the exhaust gases from the combustion of fuel in a diesel engine.

Suitably, the catalysed substrate is used to catalyse the oxidation of carbon monoxide and/or hydrocarbons and/or oxides of nitrogen.

Supported catalytic species and catalysed substrates made by the invention may be useful for a range of chemical reactions. They may be particularly useful for oxidation reactions, especially for the oxidation of chemical streams containing carbon monoxide, hydrogen or hydrocarbons. In one preferred form, the catalyst is used, preferably in the form of a catalysed substrate, for the oxidation of carbon monoxide and/or hydrocarbon compounds and/or NOx in the exhaust gas from an internal combustion engine.

In one preferred arrangement (see Example 11 hereinbelow), a monolith substrate comprises a first washcoat layer comprising a supported catalyst of the invention comprising gold and palladium and second washcoat layer comprising a supported platinum or a supported platinum-palladium catalyst. The first washcoat layer may be coated directly on the second washcoat layer or vice versa (see Applicant/Assignee's WO 2009/136206).

According to a ninth aspect, the present invention provides a method of oxidising one or more components of the exhaust gases from the combustion of fuel in a vehicle engine, the method comprising:
(x) providing a catalysed substrate obtainable by the method of the fourth aspect of the present invention; and
(y) contacting the exhaust gases with the catalysed substrate.

Suitably the catalysed substrate comprises all or part of a catalytic converter or exhaust system fitted to the vehicle. Suitably the gases produced during combustion of fuel in the engine are directed through the catalysed substrate prior to exiting the vehicle.

The supported catalytic species of the present invention have been found to have significant advantages over catalysts of the prior art. In particular, supported catalytic species in which the first metal is selected from platinum and gold and the second metal is palladium, have been found to provide improved performance when used in catalysts for the oxidation of components of exhaust gases from combustion in a diesel engine. These may be referred to as diesel oxidation catalysts. A higher conversion of carbon monoxide and hydrocarbons into oxidised species has been observed when using diesel oxidation catalysts of the invention compared to when using those of the prior art. Beneficially active conversions of oxides of nitrogen have also been observed.

In addition, when the supported catalytic species of the present invention are used in catalysed substrates formed by application of more than one washcoat, fewer problems have been observed resulting from migration of the metals within the washcoat.

Any feature of the invention may where appropriate be combined with any other feature.

Figure 1B:
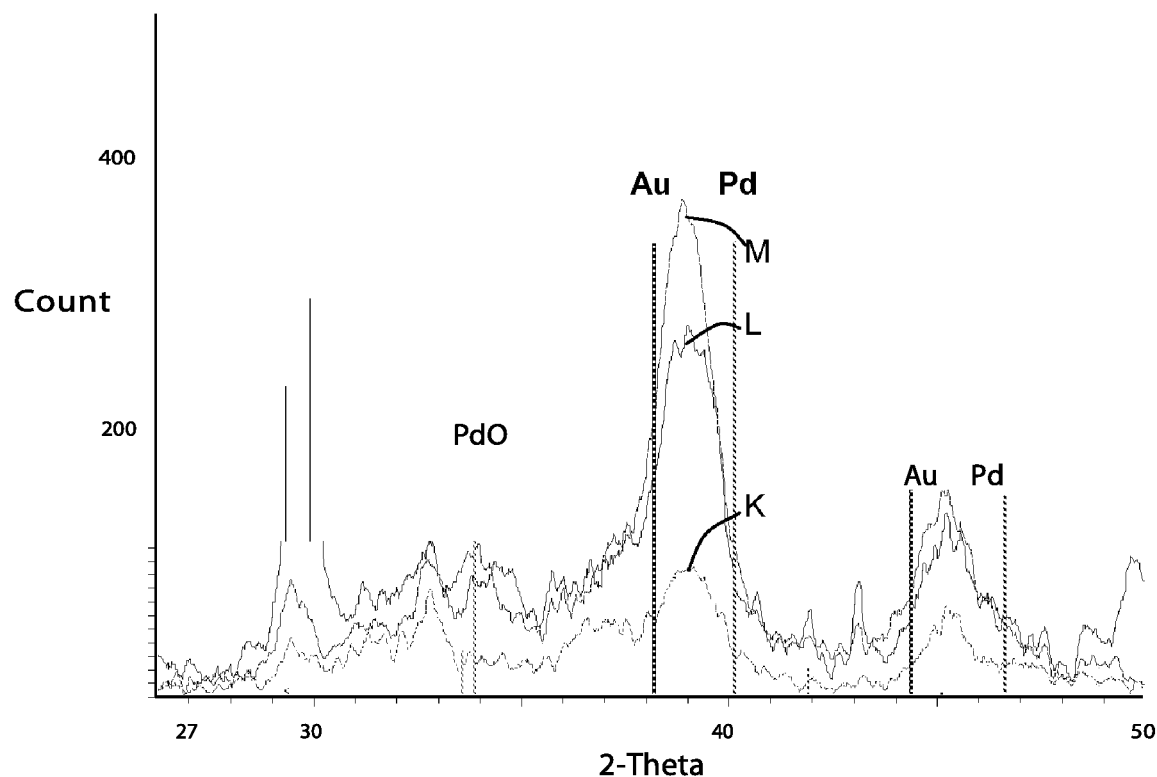
FIG. 1B shows the XRD spectra of aged sample.
Figure 2:
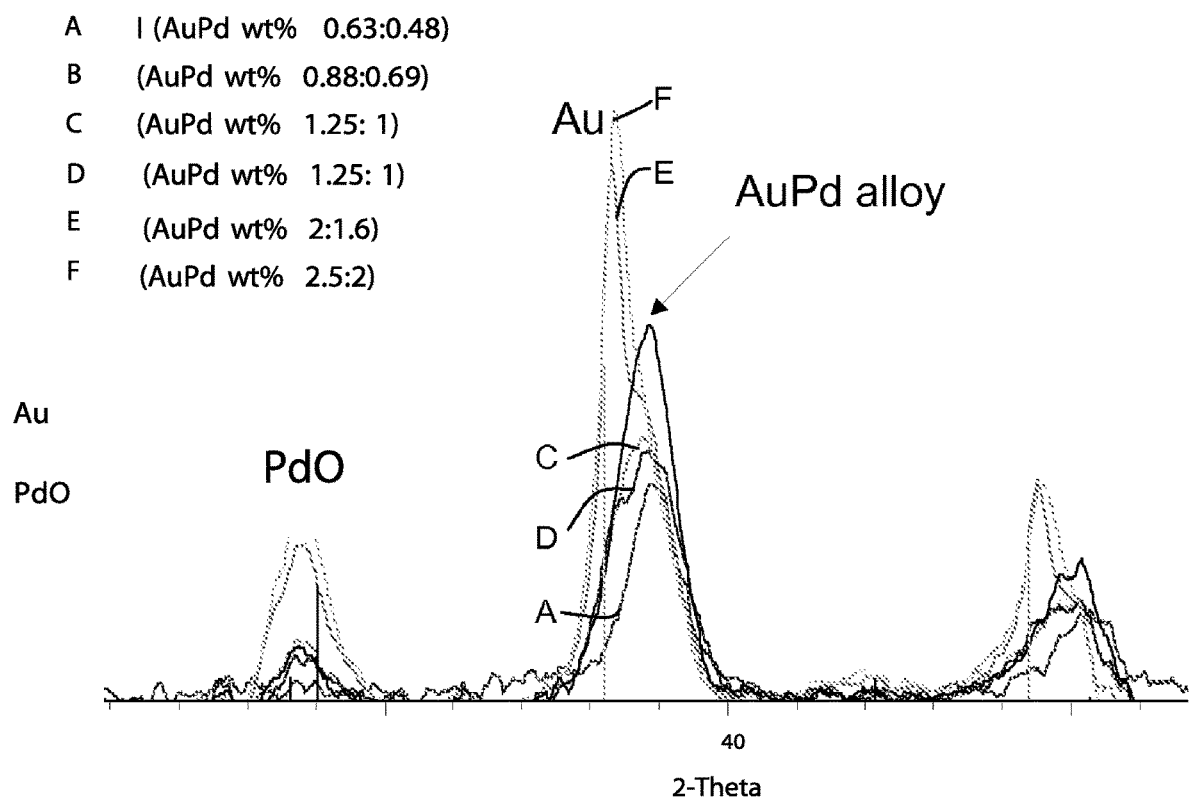
FIG. 2 shows a set of XRD spectra of catalysts.

In order that the invention may be more fully understood, the following examples are provided by way of illustration only and with reference to the accompanying drawings, wherein:

FIG. 1 shows the XRD spectra of samples K, L and M both fresh (FIG. 1a) and after ageing (FIG. 1b); and FIG. 2 shows a set of XRD spectra of catalysts A, B, C, D, E and F prepared by the method in Example 2.

EXAMPLES

Example 1-A

In a typical preparation, a 100 L vessel was filled with 44 L of deionised water and heated to 55-60° C. 2200 g of alumina powder was added into the water. The slurry was stirred for 15 min and the temperature controlled to 55° C. The pH of the slurry was raised to 8.5 by addition of $K_2CO_3$ solution. In a separate vessel a solution of $HAuCl_4$ containing 39.3 g Au and a solution of $PdCl_2$ containing 24.6 g Pd were mixed and diluted up to 4 l total volume. The mixed solution, containing both metals, was added to the main vessel over 15 minutes. The addition of the metal solution caused a large fall in pH, compensated for by the addition of $K_2CO_3$ to maintain the pH between 6 and 7. At the end of the addition of the metals the pH was adjusted to 6.38 by $K_2CO_3$ addition. As the metal compounds were allowed to hydrolyse, the pH of the mixture increased. A final stable pH of 7.5 (+1-0.1) was obtained after 1 hr stirring at 55° C. The slurry was filtered and washed with deionised water.

After drying and calcination the catalyst powder was characterised. X-ray diffraction (XRD) showed that the gold and palladium were present in the form of an alloy, having a mean particle size of about 10 nm. The amount of each metal in the catalyst was determined by ICP analysis of the dried powder using standard analytical methods Catalysts D was made by the general method described above using different amounts of gold and palladium salts to provide the catalysts having the properties shown in Tables 1 and 3. The procedure for making Catalyst D included sequential addition of the gold solution followed by the palladium solution to the slurry, instead of a mixed solution.

Example 1-B

Preparation as for Example 1 except that a solution of $Pd(NO_3)_2$ was used in place of $PdCl_2$. In this preparation, the metal solutions were not pre-mixed but were added at similar rates simultaneously to the main vessel from separate vessels.

Example 2

Catalysts A, B, C, E, F, X, Y & Z were made by the general method described above using different amounts of gold and palladium salts to provide the catalysts having the properties shown in Tables 1 and 3.

The preparation was carried out following the general method of Example 1A, with the exception that the fall in pH caused by the addition of the metal compounds to the slurry was compensated for by the addition of $K_2CO_3$ to maintain the pH between 4 and 5. The pH of the preparation increases slightly as the metal compounds hydrolyse. A final stable pH of 5.0 (+/−0.1) was obtained after 1 hr stirring at 55° C. The slurry was filtered and washed with deionised water.

After drying and calcination the catalyst powder was characterised. X-ray diffraction (XRD) showed that the gold and palladium were present in the form of an alloy, having a mean particle size of about 19 nm (see FIG. 2). Catalyst I was made using this method.

Example 3-A

The preparation described in Example 1 A was carried out. When the final slurry had been stirred for 1 hour at 55° C., the stirring was stopped and the powder allowed to settle to the bottom of the vessel. Most of the supernatant (containing soluble Au and Pd species) was removed from the vessel by decanting. Three litres of 1% hydrazine were then added into the vessel under stirring. The vessel was filled with deionised water. The pH of the slurry immediately rose to about 9. The slurry was stirred for 15 minutes and allowed to settle then the supernatant was decanted. The vessel was filled a second time with deionised water, stirred for 15 minutes and allowed to settle. The AuPd/alumina powder settled at the bottom of the vessel, the supernatant was removed by decanting and the remaining slurry was then filtered.

Catalysts G, H, I, J, K, L, M and Example 10 were made by the general method described above using different amounts of gold and palladium salts to provide the catalysts having the properties shown in Tables 1 and 3. The procedure for making Catalyst G included sequential addition of the gold solution followed by the palladium solution to the slurry, instead of a mixed solution.

Example 3-B

Preparation as for Example 3 except that a solution of $Pd(NO_3)_2$ was used in place of $PdCl_2$. In this preparation, the metal solutions were not pre-mixed, but were added at similar rates simultaneously to the main vessel from separate vessels. Catalyst F was made by the general method described above using appropriate amounts of gold and palladium salts to provide the catalysts having the properties shown in Tables 1 and 3.

Example 4

The method of Example 2A was followed until a final stable pH of 5.0 (+/−0.1) was obtained after 1 hr stirring at 55° C. Three litres of 1% hydrazine were added into the vessel under stirring. The vessel was then filled with deionised water. The pH of the slurry immediately rose to about 9. The slurry was stirred for 15 minutes and allowed to settle then the supernatant was decanted. The vessel was filled a second time with deionised water, stirred for 15 minutes and allowed to settle. The AuPd/alumina powder settled at the bottom of the vessel, the supernatant was removed by decanting and the remaining slurry was then filtered. Catalyst J was made by this method using amounts of gold and palladium compounds to give the composition shown in Table 1.

Example 5 (Comparative)

Alumina powder (755 g) was impregnated with an aqueous solution of $PdCl_2$ (containing 15 g Pd) and $HAuCl_4$ (containing 15 g Au) by the incipient wetness technique. Solutions of the respective metal salts were diluted and mixed in demineralised water to give an impregnation solution of 500 ml. The resultant impregnate was dried in a tray oven set at 60° C. overnight to give a tan-brown powder. The powder was split into 3 portions.

Example 5A

Portion 1 of Example 5 was used was used after calcining at 500° C. for at least 5 hours in air, in order to fix the metals in an insoluble form. The catalyst is designated as Catalyst T.

Example 5B

Portion 2 was reduced to the metallic state by addition of the powder to a stirred aqueous solution of hydrazine (1500 ml, 5% by weight hydrazine). After standing for about 1 hr, the supernatant solution was decanted and the material was washed with demineralised water, filtered and dried. Portion 2 was used thereafter as prepared. Catalysts U & V were prepared in this way.

Example 5C

Portion 3 was reduced to the metallic state by heating the powder in a flow of hydrogen gas (5% $H_2$ in $N_2$) at 200° C. for 0.5 hr. Thereafter the reduced material was washed with demineralised water, filtered and dried. Portion 3 was used thereafter as prepared as Catalyst W.

Example 6 (Comparative)

Alumina powder (192 g) was impregnated with an aqueous solution of $Pd(NO_3)_2$ (containing 4 g Pd) and $HAuCl_4$ (containing 4 g Au) by the incipient wetness technique. Solutions of the respective metal salts were diluted and mixed in demineralised water to give an impregnation solution of 130 ml. The resultant impregnate was dried in a tray oven set at 60° C. overnight to give a tan-brown powder. The powder was split into 3 portions.

Example 6A

Portion 1 of Example 6 was used after calcining at 500° C. for at least 5 hours in air, in order to fix the metals in an insoluble form (Catalyst N).

Example 6B

Portion 2 was reduced to the metallic state by addition of the powder to a stirred aqueous solution of hydrazine (100 ml, 5% by weight hydrazine). After standing for about 1 hr, the supernatant solution was decanted and the material was washed with demineralised water, filtered and dried. Portion 2 was used thereafter as prepared. Catalysts O and P were prepared this way.

Example 6C

Portion 3 was reduced to the metallic state by heating the powder in a flow of hydrogen gas (5% $H_2$ in $N_2$) at 200° C. for 1 hr. Thereafter the reduced material was washed with demineralised water, filtered and dried. Portion 3 was used thereafter as prepared. Catalyst Q was prepared this way.

Example 7 (Comparative)

An equivalent sample to Example 5B was prepared on silica, using the procedure of Example 5 except that silica powder was used in place of the alumina support and $Na_2PdCl_4$ was used as precursor salt. The metals were reduced to the metallic state using hydrazine solution, as described for Portion 2 of Example 5. Catalysts R and S were prepared this way. R is fresh catalyst and S was aged at in air at 750° C.

Example 8

Catalyst Testing

Various catalysts were prepared using the typical methods described in Examples 1-7 but containing the amount of metals shown in Table. The catalysts were tested for their ability to oxidise carbon monoxide and hydrocarbons under vehicle exhaust conditions using a synthetic catalyst activity test (SCAT) apparatus using the following inlet gas mixture: 1000 ppm CO, 900 ppm HC ($C_3H_6$ or n-$C_8H_{18}$ as C1), 200 ppm NO, 2 ppm $SO_2$, 12% $O_2$, 4.5% $CO_2$, 4.5% $H_2O$ and $N_2$ balance. In the Table, $CO_{T80}$ is the temperature at which 80% of the carbon monoxide was converted. $HC_{T50}$ is the temperature at which 50% of the hydrocarbon was converted. A lower number therefore indicates a catalyst that converts the gas at lower temperature and is therefore more active. Catalysts A-M were aged in air at 750° C.

Sulphur ageing of aged catalysts, where shown in the Table, was done at 300° C. with 100 ppm $SO_2$ in gas stream to provide from 45 mg S/g of catalyst. The sulphur-aged catalyst was regenerated for 20 minutes at 500° C. in the full inlet gas mixture described above.

TABLE 1

| Ref | Catalyst Prep. Example method | Au % (wt) | Pd % (wt) | Clean catalyst | | Catalyst after exposure to 45 mg S/g Catalyst | | Catalyst after regeneration at 500° C. for 20 min | |
|---|---|---|---|---|---|---|---|---|---|
| | | | | $CO_{T80}$ | $HC_{T50}$ | $CO_{T80}$ | $HC_{T50}$ | $CO_{T80}$ | $HC_{T50}$ |
| A | 1A | 1.1 | 1.0 | 198 | 197 | | | | |
| B | 1A | 1.25 | 1.0 | 166 | 163 | 258 | | 190 | |
| C | 1A | 1.24 | 1.05 | 160 | 161 | | | | |
| D | 1B | 1.37 | 1.08 | 178 | 180 | | | | |
| E | 1B | 1.45 | 1.0 | 165 | 163 | | | | |
| F | 3B | 1.18 | 1.0 | 174 | 174 | | | | |
| G | 3A | 1.45 | 1.08 | 175 | 168 | 265 | 232 | 189 | 196 |
| H | 3A | 1.66 | 1.07 | 148 | 144 | 202 | 195 | 178 | 175 |
| I | 2 | 1.16 | 1.0 | 279 | 264 | | | | |
| J | 4 | 1.21 | 1.07 | 174 | 171 | 261 | 231 | 188 | 192 |
| K | 3A | 0.45 | 0.35 | 157 | 160 | 232 | 266 | 207 | 205 |
| L | 3A | 1.39 | 1.02 | 140 | 145 | 210 | 243 | 171 | 169 |
| M | 3A | 2.26 | 1.66 | 136 | 140 | 208 | 238 | 174 | 174 |

The most active catalyst in Table 1 is Catalyst M, made by precipitating gold and palladium compounds from a slurry of alumina powder in a solution of $Pd(Cl)_2$ and $HAuCl_4$ followed by reduction with a hydrazine solution, in which the final pH following hydrolysis of the precipitate is controlled to be 7.5.

For catalysts K-M prepared by equivalent method the activity varies in line with the AuPd loading which we interpret to mean that the specific activity is constant and that, over the range of metal loadings studied, the AuPd particles are probably of the same type and are acting the same way. The benefit of such catalysts is therefore is that less material with higher AuPd loading may offer identical catalytic performances with cost and back pressure advantage in use.

Example 9 (Comparative)

Various catalysts were prepared using the methods described in Examples 5-7 but containing the amount of metals shown in Table 1. The catalysts were tested in the synthetic catalyst activity test (SCAT) apparatus as described in Example 8.

TABLE 2

(Comparative)

| Ref | Catalyst Pep. Example method | Au % (wt) | Pd % (wt) | Aged at 750° C. for 48 hours | Clean catalyst $CO_{T80}$ | Clean catalyst $HC_{T50}$ | Catalyst after exposure to 45 mg S/g Catalyst $CO_{T80}$ | Catalyst after exposure to 45 mg S/g Catalyst $HC_{T50}$ |
|---|---|---|---|---|---|---|---|---|
| N | 6A | 2 | 2 | N | 278 | 253 | | |
| O | 6B | 2 | 2 | N | 213 | 209 | 233 | 216 |
| P | 6B | 2 | 2 | Y | 180 | 186 | 260 | 248 |
| Q | 6C | 2 | 2 | N | 282 | 261 | | |
| R | 7 | 2 | 2 | N | 255 | 246 | | |
| S | 7 | 2 | 2 | Y | 285 | 283 | | |
| T | 5A | 2 | 2 | Y | 286 | 282 | | |
| U | 5B | 2 | 2 | N | 225 | 211 | | |
| V | 5B | 2 | 2 | Y | 212 | 210 | | |
| W | 5C | 2 | 2 | N | 279 | 258 | | |

The most active catalyst in Table 2 is Catalyst P, made by impregnating alumina powder with a mixed solution of $Pd(NO_3)_2$ and $HAuCl_4$ followed by reduction with a hydrazine solution.

Example 10

Characterisation

A catalyst sample containing 3.2% Au and 2.4% Pd was made according to the method in Example 3A and designated as Catalyst AA. Catalyst B was made using the method 1B Catalysts X, Y and Z were made using the method of Example 1A. The samples were examined by XRD, both as prepared (fresh) and after ageing for 48 hours in air at 750° C. Samples of catalysts K, L and M described in Table 1 were also characterised in the same way. The results are shown in Table 3 below.

Catalysts B, X, Y and Z, prepared using the method of preparation in Examples 1 and 2, when fresh, display separate bands for gold and palladium oxide with no measurable alloy particles. After ageing, these samples show some formation of alloy particles. At metal loadings above 2.25%, a bimodal distribution is observed which is characteristic of Au—Pd alloy and Au separated phases. The particle sizes of 14 and 18 nm are those for material represented by this non-Gaussian bimodal XRD band.

Example 11

Diesel Oxidation Catalyst

A—Diesel Oxidation Catalyst preparation AuPtPd 60 g/ft³ Au1:Pt1.2:Pd1.3

A Pt/Pd washcoat containing appropriate amounts of aqueous platinum and palladium salts to achieve the desired loading, high surface area alumina (approx. 85 wt % of total solids) and Beta zeolite (approx. 15 wt % of total solids) was coated on a flow-through cordierite monolith substrate (400

TABLE 3

| | | | Species present in XRD | | | | | | Au—Pd Alloy Crystallite size (nm) | |
|---|---|---|---|---|---|---|---|---|---|---|
| | | | Au | | Au—Pd alloy | | PdO | | | |
| Cat | Au % | Pd % | fresh | aged | fresh | aged | fresh | aged | fresh | aged |
| K | 0.45 | 0.35 | No | No | Yes | Yes | No | No | — | 7 |
| L | 1.39 | 1.02 | No | No | Yes | Yes | No | No | 3 | 6 |
| M | 2.26 | 1.66 | No | No | Yes | Yes | No | No | 3 | 7 |
| AA | 3.2 | 2.4 | No | No | Yes | Yes | Yes | No | — | 7 |
| X | 0.4 | 0.3 | Yes | No | No | Yes | Slight | Slight | No | 7 |
| B | 1.25 | 1.0 | Yes | No | No | Yes | Slight | Yes | No | 8 |
| Y | 2.0 | 1.7 | Yes | Yes | No | Yes | Yes | Yes | No | 14 |
| Z | 2.5 | 2.0 | Yes | Yes | No | Yes | Yes | Yes | No | 18 |

Catalysts K, L, M and AA, made using the method of Example 3, with chemical reduction immediately after precipitation, show a distinct gold-palladium alloy phase in the XRD (See FIG. 1), with no measurable gold or palladium oxide bands, except in the fresh sample of Catalyst AA, which has the highest metal loading where a small amount of PdO is observed. After ageing these catalysts possess Au—Pd alloy nanoparticles with a homogeneous AuPd particle size for metal loading up to AuPd 3.2:2.4 (wt %).

cells per square inch, 4 thousandths of an inch wall thickness, 4.66 inch diameter×5.72 inches in length) at a loading of 1.75 gin⁻³. The coated monolith substrate was dried in air at 100° C. for 30 minutes and then calcined in air at 500° C. for 2 hours. To the resulting coated monolith substrate was applied a second washcoat layer to a final loading of 1.25 gin⁻³ comprising a dispersion of the washed, i.e. still wet, solid catalyst of Example 1A (pH7.5 without reduction) which had been milled to a D90 of 15 µm (i.e. 90% of the particle size was ≤15 µm). Beta zeolite was added into the slurry at 20 wt % of total solids (i.e. the washcoat contained 80 wt % total solids of the solid catalyst of Example 1A). The resulting catalyst part was dried and calcined as the first layer and was then hydrothermally aged in air/10% water gas at 750° C. for 10 hours. The aged part was then fitted into the exhaust system of a bench-mounted light-duty Euro IV, 2.4 litre diesel engine and tested over a standard European test cycle (MVEG-B).

B—Diesel Oxidation Catalyst Preparation AuPtPd 60 g/ft$^3$ Au1:Pt1.2:Pd1.3

An identical catalyst to Example 11A was prepared, except in that in the second washcoat the washed solid catalyst of Example 3A (pH 7.5 hydrazine reduction) was used.

C—Diesel Oxidation Catalyst Preparation AuPtPd 120 g/ft3 Au1:Pt1.2:Pd1.3

A PdAu washcoat was prepared using the washed solid catalyst of Example 4 (pH5 hydrazine reduction). The washed solid catalyst was dispersed in water and milled to a D90 of 15 μm.

Beta zeolite was added into the slurry to a total solids content of 20 wt % (i.e. 80 wt % total solids content of Example 4 catalyst was used). The resulting washcoat was coated on a cordierite monolith substrate at 1.25 gin$^{-3}$ of similar volume to Example 11A. The coated monolith substrate was dried and calcined as described in Example 11A.

A Pt Pd washcoat containing aqueous salts of Pt and Pd in appropriate amounts to achieve the desired final loading high surface area alumina (85 wt % total solids content) and zeolite (15 wt % total solids content) was coated on the top of the monolith substrate coated with the PdAu and Beta zeolite layer. It will be appreciated that this is a reverse orientation of the PtPd and PdAu layers to that disclosed in Examples 11A and 11B. The orientation of this Example 11C is disclosed in WO 2009/136206A1. The resulting product was dried, calcined and aged as described in Example 11A and the aged catalyst was fitted into the exhaust system of a bench-mounted Euro V-2.4 litre engine diesel engine for a light duty truck (different from the engine used in Examples 11A and 11B) and run over a standard European test cycle (MVEG-B).

D—Diesel Oxidation Catalyst Preparation AuPtPd 120 g/ft$^3$ Au1:Pt1.2:Pd1.3

An identical catalyst to Example 11C was prepared except in that in the PdAu layer, the washed solid catalyst of Example 3A (pH7.5 hydrazine reduction) was used.

A comparison of the results of the activity of the diesel oxidation catalysts of Example 11A with Example 11B simultaneously to convert carbon monoxide (CO) and unburned hydrocarbons (HC) present in engine-out exhaust gas is shown in Table A and a comparison of the engine test results (standard European test cycle (MVEG-B)) of Examples 11C with 11D is shown in Table B.

TABLE A

| Example | Example 11 A pH 7.5 without reduction | | | Example 11B pH 7.5 hydrazine reduction | | |
| --- | --- | --- | --- | --- | --- | --- |
| | Engine out | Post DOC | Conversion Efficiency (%) | Engine out | Post DOC | Conversion Efficiency (%) |
| CO emission (g) | 13.5 | 6.6 | 50.9 | 13.5 | 5.1 | 62.0 |
| HC emission (g) | 3.6 | 1.1 | 70.0 | 3.5 | 0.9 | 74.1 |

TABLE B

| Example | Example 11 C pH 5 hydrazine reduction | | | Example 11D PH 7.5 hydrazine reduction | | |
| --- | --- | --- | --- | --- | --- | --- |
| | Engine out | Post DOC | Conversion Efficiency (%) | Engine out | Post DOC | Conversion Efficiency (%) |
| CO emission (g) | 27.7 | 8.0 | 71.2 | 27.7 | 5.7 | 79.4 |
| HC emission (g) | 5.0 | 1.25 | 75.1 | 5.0 | 0.9 | 81.5 |

To summarise, Example 11 A in table A shows the cumulative CO/HC emissions in grams from an engine and conversion efficiency in % through the duration of the test for a catalyst made according to Example 1A, i.e. by precipitation and then calcination of the catalyst powder to fix the metals in an insoluble form;

Example 11 B in table A shows the cumulative CO/HC emissions in grams from an engine and conversion efficiency in % through the duration of the test for the catalyst made by Example 3A, i.e. by precipitation at pH 7.5 followed by chemical reduction of the metals without a subsequent calcination step;

Example 11 C in table B shows the cumulative CO/HC emissions in grams from a second engine and conversion efficiency in % through the duration of the test for a catalyst made according to Example 4, i.e. by precipitation at pH 5 followed by chemical reduction of the metals without a subsequent calcination step;

Example 11 D in table B shows the cumulative CO/HC emissions in grams from a second engine and conversion efficiency in % through the duration of the test for a catalyst made according to Example 3A, i.e. at pH 7.5 followed by chemical reduction of the metals without a subsequent calcination step.

From the results shown in Table A, it can be seen that the catalyst prepared with hydrazine-reduced material shows the better conversion efficiency for both CO and HC oxidation over the test cycle, i.e. 62% vs. 50.9% CO conversion efficiency; and 74.1 vs. 62.0% conversion efficiency.

Referring to Table B, it can be seen that the HC and CO conversion efficiency of the Example 11C diesel oxidation catalyst (DOC) is better than the Example 11D DOC prepared with AuPd produced at pH 7.5 (79.4% vs. 71.2% CO conversion efficiency; and 81.5% vs. 75.1% HC conversion efficiency).

From these results it can be seen that for diesel oxidation catalyst, the activity trend for CO and HC conversion is the Example 3A catalytic material >Example 1A catalytic material and the Example 4 catalytic material >Example 3A catalytic material.

For the avoidance of doubt the entire contents of all documents referenced herein are incorporated herein by reference.

Example 12

A supported catalytic species (Example 12A) comprising platinum and palladium supported on an alumina particulate support material and having a 2Pt:Pd weight ratio was prepared using the method according to the first aspect of the present invention, using analogous methods to those disclosed for AuPd supported catalytic species of the Examples, using hydrazine reduction. The wet cake obtained at the end of the method was used to make a washcoat which was applied to the same monolith substrates as described in connection with Example 11A (no zeolite). The washcoated monolith substrate was dried, calcined and then aged in the same way as in Example 11A. Using similar techniques, three substrate monoliths each having a different total platinum group metal loading were obtained, as set out in the Table below.

As a Comparative Example, a supported catalyst (Example 12B) comprising platinum and palladium supported on alumina particulate support material and having an identical 2Pt:Pd weight ratio was prepared by adding appropriate quantities of aqueous solutions of platinum nitrate and palladium nitrate to a slurry of alumina to form a washcoat. The washcoat was applied to a monolith substrate at the same washcoat loading as that of Example 12A and the coated monolith substrate was dried, calcined and aged in the same way as for Example 12A.

The coated substrate monoliths of Examples 12A and 12B were tested on the same bench-mounted engine as that used for testing Examples 11A and 11B and using the same standard European test cycle (European MVEG-B). The results for percentage CO conversion are shown in Table C.

TABLE C

| PlatinumGroup Metal Loading (g/ft$^3$) | % CO conversion Example 12A Catalyst | % CO conversion Example 12B Catalyst |
| --- | --- | --- |
| 50 | 50.8% | 47.0% |
| 90 | 58.6% | 53.0% |
| 130 | 67.0% | 61.9% |

Example 13

Using similar techniques to those described for the preparation of Example 12A, a first supported catalytic species having a 2Pt:Pd weight ratio on a silica-alumina support material was prepared and, separately, a second supported catalytic species having a Pt:1.6Pd weight ratio on a silica-alumina support material was prepared. A washcoat was prepared by combining these two components and Beta zeolite as described for Example 11A and the resulting washcoat was applied to the same monolith substrate as described in Example 11A to a target total platinum group metal loading of 60 gft$^{-3}$ and the resulting coated part was then dried and calcined as described in Example 11A. Overall, the weight ratio of Pt:Pd was 1:1. The part was then aged in a similar manner to that described in Example 11A, except in that the ageing was for 15 hours instead of 10 hours. The resulting catalytic converter is referred to herein as Example 13A.

A Comparative Example (Example 13B) was prepared in the same way as described for Example 12B using the same silica-alumina particulate support material as was used in Example 13A. The Pt:Pd weight ratio was 1:1. The Example 13B catalyst was otherwise prepared in the same way as the Example 13A (i.e. the same washcoat loading was used, the same total platinum group metal loading, i.e. 60 gft$^{-3}$, the same zeolite content, the same substrate monolith, the same drying, calcining and ageing regimes were used etc.).

The catalytic converters of Examples 13A and 13B were tested over the same drive cycle using the same engine as was used to test Examples 11A and 11B. The resulting CO conversion efficiencies are disclosed in Table D, from which it can be seen that using the compositions of the present invention, a significant improvement in CO conversion can be achieved from a catalytic converter comprising the same Pt:Pd weight ratio as the Comparative Example 13B.

TABLE D

| PlatinumGroupMetal Loading (g/ft$^3$) | % CO conversion Example 13A Catalyst | % CO conversion Example 13B Catalyst |
| --- | --- | --- |
| 60 | 44.1% | 39.1% |

Example 14

Using similar techniques to those described for the preparation of Example 13A, a first catalytic species comprising PtPd supported on a silica-alumina support material was prepared and then combined in a washcoat with a second catalytic species comprising AuPd supported on a silica-alumina support material obtained using the methods of Example 3A (pH 7.5 hydrazine reduction) (no zeolite). The resulting washcoat was applied to the substrate monolith described in Example 11A at a total precious metal loading of 120 gft$^{-3}$ and at a weight ratio of 33Au:40Pt:47Pd. In all other respects the coated substrate monolith was prepared as described in connection with Example 13A. The resulting catalytic converter is referred to herein as Example 14A.

In a Comparative Example (Example 14B), a slurry of the AuPd component of Example 14A was prepared to which was added aqueous platinum nitrate and aqueous palladium nitrate. The resulting washcoat was coated onto the same substrate monolith as was used for making the catalytic converter of Example 14A at the same total precious metal loading and at the same Au:Pt:Pd weight ratio as for Example 14A. In all other respects the catalytic converter of Example 14B was prepared identically to that of Example 14B. So, the support material of Example 14B supported the AuPd alloy and the Pt and Pd metal components.

The catalytic converters of Examples 14A and 14B were tested on the same drive cycle using the same engine as was used to test Examples 11A and 11B. The resulting CO conversion efficiencies are disclosed in Table E.

TABLE E

| Precious Metal Loading (g/ft$^3$) | % CO conversion Example 14A Catalyst | % CO conversion Example 14B Catalyst |
| --- | --- | --- |
| 120 | 63.5% | 57.3% |

For the avoidance of doubt any and all patent or other publications referred to herein are incorporated herein by reference in their entirety.

The invention claimed is:

1. A method of making a supported catalytic species comprising an alloy of at least two metals, the method comprising the steps of:
    (i) preparing an initial slurry mixture comprising a particulate support material and a solution of a first metal compound, a second metal compound, and an alkaline precipitating agent, wherein the initial slurry mixture has a pH in a range of from 6 to 9; then
    (ii) agitating the initial slurry mixture for a time sufficient to form an agitated slurry mixture comprising the particulate support material, comprising hydrolyzed metal solids deposited thereon and formed from the reaction of the alkaline precipitating agent and the first and second metal compounds, and an associated liquid, while maintaining the agitated slurry mixture at a pH in a range of from 6 to 9; and then
    (iii) contacting the hydrolyzed metal solids deposited on the particulate support material with a reducing agent to form the supported catalytic species, such that the first and second metals have been reduced to form a first reduced metal and a second reduced metal, respectively, and both are supported on the particulate support material;
    wherein the first metal in the first metal compound and the second metal in the second metal compound is each independently gold, palladium, platinum, rhodium, iridium, silver, osmium or ruthenium; and
    the first metal is not the same as the second metal.

2. A method according to claim 1, wherein the first metal is selected from gold, platinum and rhodium and the second metal is palladium.

3. A method according to claim 2, wherein the first metal is gold and the second metal is palladium.

4. A method according to claim 2, wherein the first metal is platinum and the second metal is palladium.

5. A method according to claim 1, wherein the reducing agent comprises hydrazine.

6. The method of claim 1, wherein at least 80 wt % of the first reduced metal on the particulate support material and at least 80 wt % of the second metal on the particulate support material is in the form of an alloy.

7. The method of claim 3, wherein 70% or more of the gold and 70% or more of the palladium are present in the form of an alloy of palladium and gold, the average metal crystallite size of the alloy is <15 nm after ageing in air for 48 hours at 750° C. and the catalyst particle contains a total of from 0.1-10% by weight of palladium and gold.

8. A method of preparing a catalyzed substrate, the method comprising the steps of:
    (i) preparing a first supported catalytic species according to claim 1, and further
    (ii) separating and washing the first supported catalytic species;
    (iii) preparing a washcoat by forming a slurry of the first supported catalytic species; and
    (iv) contacting the washcoat with a substrate.

9. A method according to claim 8 which does not include a drying or calcining step between steps (ii) and step (iii).

10. A method according to claim 8, wherein step (iii) comprises preparing a washcoat by forming a slurry of the first supported catalytic species and one or more second supported catalytic species different from the first supported catalytic species.

11. The method of claim 1, wherein the particulate metal support comprises alumina, silica, aluminosilicate, titania, zirconia, ceria, carbon or a mixture or a composite thereof.

12. The method of claim 1, wherein the particulate metal support comprises alumina, silica, zirconia, ceria, or a mixture or a composite thereof.

13. The method of claim 1, wherein the initial slurry mixture has a solids content of less than 25 wt %.

14. The method of claim 1, wherein the alkaline precipitating agent comprises a metal carbonate, bicarbonates, or hydroxide.

15. The method of claim 1, wherein the alkaline precipitating agent is an aqueous solution of potassium carbonate or potassium bicarbonate.

16. The method of claim 1, wherein the hydrolyzed metal solids are separated from the agitated slurry mixture before contacting with the hydrolyzed metal solids with the reducing agent.

17. The method of claim 1 further comprising drying, calcining, and/or ageing the supported catalytic species.

18. The method of claim 17, wherein the reduced first and second metals that are supported on the particulate support material are in the form of an alloy.

19. The method of claim 3, wherein the slurry mixture has an initial pH, before agitating, in a range of from 6 to 7.

20. The method of claim 3, wherein the agitated slurry of hydrolyzed metal solids is maintained during agitation to have a pH in a range of from 7 and 8.

21. The method of claim 1, comprising the steps of:
    (i) preparing an initial slurry mixture comprising:
        (a) a particulate support material comprising alumina, silica-alumina, ceria or ceria-zirconia, and (b) a solution comprising a gold compound, a palladium compound, and an alkaline precipitating agent comprising potassium carbonate or potassium bicarbonate, the initial slurry mixture having a pH in a range of from 6 to 7; then
(ii) agitating the initial slurry mixture for a time sufficient to form hydrolyzed gold and/or palladium solids deposited on the particulate support material, while maintaining the agitated slurry mixture at a pH in a range of from 7 to 8; then
(iii) optionally separating the particulate support material, comprising the hydrolyzed gold and/or palladium solids deposited thereon and formed from the reaction of the alkaline precipitating agent and the gold and palladium compounds from the agitated slurry mixture; and then
(iii) contacting the hydrolyzed gold and/or palladium solids with hydrazine to form the supported catalytic species.

22. The method of claim 1, comprising the steps of:
(i) preparing an initial slurry mixture comprising:
   (a) a particulate support material comprising alumina, silica-alumina, ceria or ceria-zirconia,
   (b) a solution comprising a platinum compound, a palladium compound, and an alkaline precipitating agent comprising potassium carbonate or potassium bicarbonate,
the initial slurry mixture having a pH in a range of from 8 to 9 when the particulate support is alumina; then
(ii) agitating the initial slurry mixture for a time sufficient to form hydrolyzed platinum and/or palladium solids, while maintaining the agitated slurry mixture at a pH in a range of from 7 to 8; then
(iii) optionally separating the particulate support material, comprising the hydrolyzed platinum and/or palladium solids deposited thereon and formed from the reaction of the alkaline precipitating agent and the platinum and palladium compounds from the agitated slurry mixture; and then
(iii) contacting the hydrolyzed platinum and/or palladium solids with hydrazine.

23. The method of claim 21, wherein the initial slurry mixture has a solids content of less than 25 wt %.

24. The method of claim 22, wherein the initial slurry mixture has a solids content of less than 25 wt %.

* * * * *